United States Patent
Curcio et al.

(10) Patent No.: US 8,391,896 B2
(45) Date of Patent: Mar. 5, 2013

(54) METHOD AND APPARATUS FOR PROVIDING A GEO-PREDICTIVE STREAMING SERVICE

(75) Inventors: Igor Danilo Diego Curcio, Tampere (FI); Varun Singh, Espoo (FI); Kumar Malamal Vadakital Vinod, Tampere (FI)

(73) Assignee: Nokia Corporation, Espoo (FI)

( * ) Notice: Subject to any disclaimer, the term of this patent is extended or adjusted under 35 U.S.C. 154(b) by 235 days.

(21) Appl. No.: 12/833,747

(22) Filed: Jul. 9, 2010

(65) Prior Publication Data

US 2012/0009890 A1     Jan. 12, 2012

(51) Int. Cl.
*H04W 24/00* (2009.01)
(52) U.S. Cl. .................. 455/456.3; 455/414.2
(58) Field of Classification Search ............... 455/414.1, 455/414.2, 440, 441, 456.1, 456.2, 456.3, 455/456.6
See application file for complete search history.

(56) References Cited

U.S. PATENT DOCUMENTS

| | | | |
|---|---|---|---|
| 7,103,369 B2 * | 9/2006 | Sato et al. | 455/456.3 |
| 7,565,155 B2 * | 7/2009 | Sheha et al. | 455/456.1 |
| 7,881,730 B2 * | 2/2011 | Sheha et al. | 455/456.1 |
| 7,974,637 B1 * | 7/2011 | Taveniku | 455/456.1 |
| 8,027,877 B2 * | 9/2011 | Crolley | 705/14.63 |
| 8,095,152 B2 * | 1/2012 | Sheha et al. | 455/456.1 |
| 2007/0259670 A1 | 11/2007 | Sakhpara | |

FOREIGN PATENT DOCUMENTS

| | | |
|---|---|---|
| EP | 1 777 890 A1 | 4/2007 |
| EP | 1 959 703 A1 | 8/2008 |
| EP | 2073486 A1 * | 6/2009 |

OTHER PUBLICATIONS

International Search Report and Written Opinion from International Patent Application No. PCT/IB2011/053063, mailed Dec. 16, 2011.
3GPP TSB-SA4#32 Meeting; Tdoc S4-040454; "Interworking of PSS rate adaptation and interleaved packetization"; 3rd Generation Partnership Project (3GPP); Aug. 16-20, 2004, Prague, Czech Republic.

* cited by examiner

*Primary Examiner* — Sonny Trinh
(74) *Attorney, Agent, or Firm* — Alston & Bird LLP

(57) ABSTRACT

A method for providing geo-predictive streaming services may include receiving, at a mobile terminal, an indication of network performance parameters associated with a corresponding time and location of a projected route of the mobile terminal, determining, at the mobile terminal, whether a portion of the projected route corresponds to an outage event with respect to data being streamed to the mobile terminal, and, in response to a determination that the outage event corresponds to the portion of the projected route, causing communication of at least one of a geo-predictive next application data unit and an estimated capacity vector to a streaming server to a streaming server providing the data being streamed to cause a modification to a data transmission rate at which data is to be streamed to the mobile terminal. A corresponding computer program product, system and apparatus are also provided.

29 Claims, 10 Drawing Sheets

```
 0                   1                   2                   3
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|                       name   (ASCII "CMUP")                   |
+-+-+-+-+-+-+-+-+-+-+-+-+-+-+-+-+-+-+-+-+-+-+-+-+-+-+-+-+-+-+-+-+
|                            Client ID                          |
+-+-+-+-+-+-+-+-+-+-+-+-+-+-+-+-+-+-+-+-+-+-+-+-+-+-+-+-+-+-+-+-+
|S|   Lat mantissa     |             Lat exponent               |
+-+-+-+-+-+-+-+-+-+-+-+-+-+-+-+-+-+-+-+-+-+-+-+-+-+-+-+-+-+-+-+-+
|S|   Lon mantissa     |             Lon exponent               |
+-+-+-+-+-+-+-+-+-+-+-+-+-+-+-+-+-+-+-+-+-+-+-+-+-+-+-+-+-+-+-+-+
|                        Client Throughput                      |
+-+-+-+-+-+-+-+-+-+-+-+-+-+-+-+-+-+-+-+-+-+-+-+-+-+-+-+-+-+-+-+-+
|                         Speed of User                         |
+-+-+-+-+-+-+-+-+-+-+-+-+-+-+-+-+-+-+-+-+-+-+-+-+-+-+-+-+-+-+-+-+
```

LISTING 1: ALTERNATIVE SIGNALING: JSON EXAMPLE FOR CMUP

```
{"CONGESTION_MAP_UPDATE": {
        "POSITION" : |
               {"ClientID"  :"IPADDR" .
                "LAT":   "+60.012334" ,
                "LON":   "+23.23322" ,
                "Speed":  " 16.67_m/s" ,
                "Trajectory:"   " 30_NNE"
               }|
        "Operator" : |
               {"name"  : "Elisa" ,
                "Signal_Strength" ': "80%"  or   "-20_db" ,
                "Type" : "3G" ,
                "THROUGHPUT"  :  "384_kbps"
                "TIME"  :  "08:45_UTC"
               }|
}}
```

FIG. 7

```
 0                   1                   2                   3
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|                       name  (ASCII "CMIN")                    |
+-+-+-+-+-+-+-+-+-+-+-+-+-+-+-+-+-+-+-+-+-+-+-+-+-+-+-+-+-+-+-+-+
|                          Sequence No                          |
+-+-+-+-+-+-+-+-+-+-+-+-+-+-+-+-+-+-+-+-+-+-+-+-+-+-+-+-+-+-+-+-+
|                         Total records (N)                     |
+-+-+-+-+-+-+-+-+-+-+-+-+-+-+-+-+-+-+-+-+-+-+-+-+-+-+-+-+-+-+-+-+
|S|   Lat mantissa      |              Lat exponent              |
+-+-+-+-+-+-+-+-+-+-+-+-+-+-+-+-+-+-+-+-+-+-+-+-+-+-+-+-+-+-+-+-+
|S|   Lon mantissa      |              Lon exponent              |
+-+-+-+-+-+-+-+-+-+-+-+-+-+-+-+-+-+-+-+-+-+-+-+-+-+-+-+-+-+-+-+-+
|                       Expected Throughput  (1)                |
+-+-+-+-+-+-+-+-+-+-+-+-+-+-+-+-+-+-+-+-+-+-+-+-+-+-+-+-+-+-+-+-+
|                                + + +                          |
+-+-+-+-+-+-+-+-+-+-+-+-+-+-+-+-+-+-+-+-+-+-+-+-+-+-+-+-+-+-+-+-+
|                                + + +                          |
+-+-+-+-+-+-+-+-+-+-+-+-+-+-+-+-+-+-+-+-+-+-+-+-+-+-+-+-+-+-+-+-+
|                                + + +                          |
+-+-+-+-+-+-+-+-+-+-+-+-+-+-+-+-+-+-+-+-+-+-+-+-+-+-+-+-+-+-+-+-+
| |   Lat mantissa      |              Lat exponent              |
+-+-+-+-+-+-+-+-+-+-+-+-+-+-+-+-+-+-+-+-+-+-+-+-+-+-+-+-+-+-+-+-+
| |   Lon mantissa      |              Lon exponent              |
+-+-+-+-+-+-+-+-+-+-+-+-+-+-+-+-+-+-+-+-+-+-+-+-+-+-+-+-+-+-+-+-+
|                       Expected Throughput  (N)                |
+-+-+-+-+-+-+-+-+-+-+-+-+-+-+-+-+-+-+-+-+-+-+-+-+-+-+-+-+-+-+-+-+
                                                                |
```

LISTING 3: ALTERNATIVE SIGNALING: JSON EXAMPLE FOR CMIN

```
{"CONGESTION_MAP_INFORMATION": {
        "POSITION":[
           {"LAT":  "+60.012334" ,
            "LON":  "+23.23322" ,
            "THROUGHPUT" :  "96_kbps"
           }]
}}
```

*FIG. 8*

METHOD AND APPARATUS FOR PROVIDING A GEO-PREDICTIVE STREAMING SERVICE

TECHNOLOGICAL FIELD

Embodiments of the present invention relate generally to wireless communication technology and, more particularly, relate to a method and apparatus for providing a geo-predictive streaming service.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. Alternatively, the network device may respond to commands or requests made by the user, e.g., content searching, mapping or routing services, etc. The services may be provided from a network server or other network device, or even from the mobile terminal such as, for example, a mobile telephone, a mobile navigation system, a mobile computer, a mobile television, a mobile gaming system, etc.

BRIEF SUMMARY

A method, apparatus and computer program product are therefore provided to enable the provision of a geo-predictive streaming service. Accordingly, for example, determinations may be made as to expectations that data outages or service interruptions can be expected for a corresponding location at which the device is projected be in the future. Thereafter, knowing the time and duration of an expected outage or service interruption, some embodiments of the present invention may provide for pre-buffering of a sufficient amount of data to cover the expected outage or service interruption. Moreover, in some cases, the pre-buffering may be scheduled proximate to the expected outage or service interruption.

In one example embodiment, a method of providing a geo-predictive streaming service is provided. The method may include receiving, at a mobile terminal, an indication of network performance parameters associated with a corresponding time and location of a projected route of the mobile terminal, determining, at the mobile terminal, whether a portion of the projected route corresponds to an outage event with respect to data being streamed to the mobile terminal, and, in response to a determination that the outage event corresponds to the portion of the projected route, causing communication of at least one of a geo-predictive next application data unit and an estimated capacity vector to a streaming server providing the data being streamed to cause a modification to a data transmission rate at which data is to be streamed to the mobile terminal. The geo-predictive next application data unit comprises a total buffer space, an amount of data deficit associated with the outage event, and a buffering compensation time. The estimated capacity vector comprises at least one expected channel capacity and at least one time offset corresponding to said at least one expected channel capacity.

In another example embodiment, a computer program product for providing a geo-predictive streaming service is provided. The computer program product includes at least one computer-readable storage medium having computer-executable program code instructions stored therein. The computer-executable program code instructions may include program code instructions for receiving, at a mobile terminal, an indication of network performance parameters associated with a corresponding time and location of a projected route of the mobile terminal, determining, at the mobile terminal, whether a portion of the projected route corresponds to an outage event with respect to data being streamed to the mobile terminal, and, in response to a determination that the outage event corresponds to the portion of the projected route, causing communication of at least one of a geo-predictive next application data unit and an estimated capacity vector to a streaming server providing the data being streamed to cause a modification to a data transmission rate at which data is to be streamed to the mobile terminal. The geo-predictive next application data unit comprises a total buffer space, an amount of data deficit associated with the outage event, and a buffering compensation time. The estimated capacity vector comprises at least one expected channel capacity and at least one time offset corresponding to said at least one expected channel capacity.

In another example embodiment, an apparatus for providing a geo-predictive streaming service is provided. The apparatus may include at least one processor and at least one memory including computer program code. The at least one memory and the computer program code may be configured to, with the at least one processor, cause the apparatus to perform at least receiving, at a mobile terminal, an indication of network performance parameters associated with a corresponding time and location of a projected route of the mobile terminal, determining, at the mobile terminal, whether a portion of the projected route corresponds to an outage event with respect to data being streamed to the mobile terminal, and, in response to a determination that the outage event corresponds to the portion of the projected route, causing communication of at least one of a geo-predictive next application data unit and an estimated capacity vector to a streaming server providing the data being streamed to cause a modification to a data transmission rate at which data is to be streamed to the mobile terminal. The geo-predictive next application data unit comprises a total buffer space, an amount of data deficit associated with the outage event, and a buffering compensation time. The estimated capacity vector comprises at least one expected channel capacity and at least one time offset corresponding to said at least one expected channel capacity.

In another example embodiment, a system for providing a geo-predictive streaming service is provided. The system may include a mobile terminal receiving streamed data, a streaming server providing the streamed data to the mobile terminal, and a congestion map server. The mobile terminal may be configured to receive an indication of network performance parameters associated with a corresponding time and location of a projected route of the mobile terminal from the congestion map server, determine whether a portion of the projected route corresponds to an outage event with respect to data being streamed to the mobile terminal, and, in response to a determination that the outage event corresponds to the portion of the projected route, cause communication of at least one of a geo-predictive next application data unit and an estimated capacity vector to the streaming server to cause the streaming server to modify a data transmission rate of the data being streamed to the mobile terminal. The geo-predictive next application data unit comprises a total buffer space, an amount of data deficit associated with the outage event, and a buffering compensation time. The estimated capacity vector comprises at least one expected channel capacity and at least one time offset corresponding to said at least one expected channel capacity.

In another example embodiment, an apparatus for facilitating provision of a geo-predictive streaming service is provided. The apparatus may include at least one processor and at least one memory including computer program code. The at least one memory and the computer program code may be configured to, with the at least one processor, cause the apparatus to perform at least providing streaming data to a mobile terminal, receiving, in response to a determination by the mobile terminal that an outage event corresponds to a portion of a projected route of the mobile terminal, communication of at least one of a geo-predictive next application data unit and an estimated capacity vector, and causing modification of a data transmission rate at which data is to be streamed to the mobile terminal based on the at least one of the geo-predictive next application data unit and the estimated capacity vector. The geo-predictive next application data unit comprises a total buffer space, an amount of data deficit associated with the outage event, and a buffering compensation time. The estimated capacity vector comprises at least one expected channel capacity and at least one time offset corresponding to said at least one expected channel capacity.

In another example embodiment, a method for facilitating provision of a geo-predictive streaming service is provided. The method may include providing streaming data to a mobile terminal, receiving, in response to a determination by the mobile terminal that an outage event corresponds to a portion of a projected route of the mobile terminal, communication of at least one of a geo-predictive next application data unit and an estimated capacity vector, and causing modification of a data transmission rate at which data is to be streamed to the mobile terminal based on the at least one of the geo-predictive next application data unit and the estimated capacity vector. The geo-predictive next application data unit comprises a total buffer space, an amount of data deficit associated with the outage event, and a buffering compensation time. The estimated capacity vector comprises at least one expected channel capacity and at least one time offset corresponding to said at least one expected channel capacity.

BRIEF DESCRIPTION OF THE DRAWING(S)

Having thus described embodiments of the invention in general terms, reference will now be made to the accompanying drawings, which are not necessarily drawn to scale, and wherein:

FIG. 7 illustrates a message format for a congestion map update according to an example embodiment of the present invention;

FIG. 8 illustrates a message format for congestion map information according to an example embodiment of the present invention;

DETAILED DESCRIPTION

Figure 1:
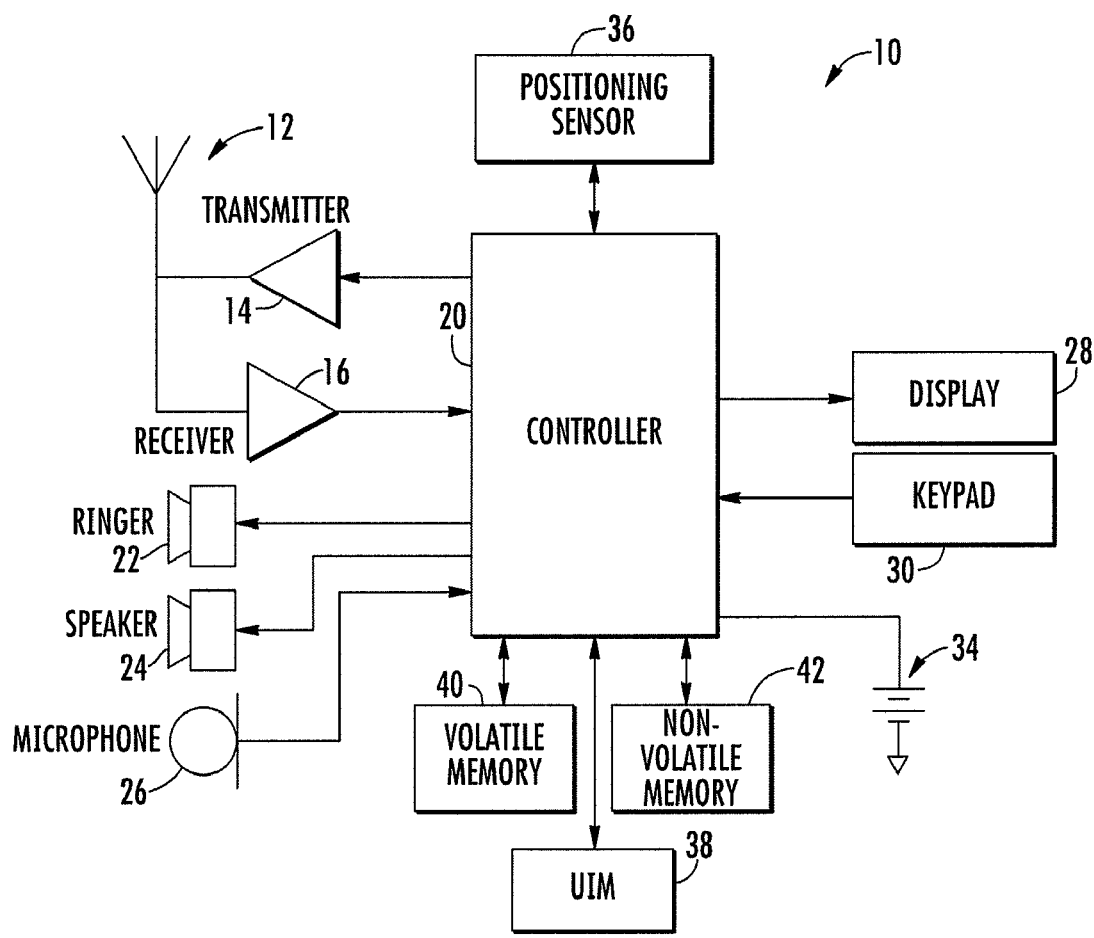
FIG. 1 is a schematic block diagram of a mobile terminal that may employ an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Due to the ubiquitous nature of mobile electronic devices, people of all ages and education levels are now utilizing mobile terminals to communicate with other individuals or contacts, receive services and/or to share information, media and other content. Additionally, given recent advances in processing power, battery life, the availability of peripherals such as global positioning system (GPS) receivers and the development of various applications, mobile electronic devices are increasingly used by individuals for receiving location dependent services. Furthermore, mobile electronic devices are also becoming popular mechanisms by which users communicate with each other and consume content. For example, multimedia streamed content such as video on demand (VoD), Internet Protocol television (IPTV), podcasting, and other types of multimedia streaming are becoming popular targets for users desiring to consume content.

However, although the capabilities of mobile electronic devices with respect to acquiring and rendering the types of content described above continue to improve, the mobility of such devices inevitably introduces challenges with respect to the provision of uninterrupted or pause-less play of the content. In this regard, limits to link capacity, packet losses and link outages may cause interruptions in playback of streaming content. To prevent such interruptions, the playback rate is typically kept constant, but initiation of the playback is delayed to allow some portion of pre-buffering to occur. Pre-buffered data may then be used to provide pause-less playback during periods of unavailability of data. However, after the period of unavailable data extends beyond the amount of pre-buffered data, skips in playback may occur or, if a retransmission mechanism (e.g., ARQ) is employed, alternative pauses and restarts in the playback may occur without necessarily losing any data.

Progressive streaming or progressive playback is one mechanism that has been developed to mitigate the problem described above. In progressive playback, which is realized by TCP transmission, variable channel conditions are overcome by utilizing all available link capacity to buffer more data than necessary to account for lower link capacity periods that may be encountered. Additionally, automatic request schemes such as forward error correction (FEC) may be employed to provide redundancy or retransmission to improve error resilience. However, the redundancy and retransmission consume additional bandwidth, may cause congestion losses due to increased consumption of network capacity and may be limited by the amount of available memory at a mobile device employing progressive playback. Accordingly, it may be desirable to address some of the issues described above.

Some embodiments of the present invention may be used to identify situations in which an outage region is encountered in a trajectory by a client device receiving streaming data. In an outage region, network congestion, low network bandwidth, poor network connection and/or the like are likely to result in a situation in which available data transfer rates are insufficient to maintain a current playback rate of streaming data without lost data or interruption. After such situations are identified, e.g., by the corresponding time and duration of occurrence, a streaming client of a mobile terminal may be enabled to request the use of excess channel capacity, if available, be provided to pre-buffer an amount of data sufficient to avoid any loss of data or interruption.

FIG. 1, one example embodiment of the invention, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, numerous types of mobile terminals, such as portable digital assistants (PDAs), mobile telephones, pagers, mobile televisions, gaming devices, laptop computers, cameras, video recorders, audio/video players, radios, positioning devices, e.g., global positioning system (GPS) devices, or any combination of the aforementioned, and other types of voice and text communications systems, may readily employ embodiments of the present invention.

The mobile terminal 10 may include an antenna 12, or multiple antennas, in operable communication with a transmitter 14 and a receiver 16. The mobile terminal 10 may further include an apparatus, such as a controller 20 or other processing device, which provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136, time division multiple access (TDMA), global system for mobile communication (GSM), and IS-95 code division multiple access (CDMA), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative, or additionally, the mobile terminal 10 may be capable of operating in accordance with non-cellular communication mechanisms. For example, the mobile terminal 10 may be capable of communication in a wireless local area network (WLAN) or other communication networks described below in connection with FIG. 2.

In some embodiments, the controller 20 may include circuitry desirable for implementing audio and logic functions of the mobile terminal 10. For example, the controller 20 comprises one or more digital signal processors and/or one or more microprocessors. The controller may further comprise one or more analog to digital converters, one or more digital to analog converters and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In addition, the mobile terminal 10 may include a positioning sensor 36. The positioning sensor 36 may include, for example, a global positioning system (GPS) sensor, an assisted global positioning system (Assisted-GPS) sensor, a Bluetooth (BT)-GPS mouse, other GPS or positioning receivers or the like. However, in one exemplary embodiment, the positioning sensor 36 may include a pedometer or inertial sensor. In this regard, the positioning sensor 36 may be capable of determining a location of the mobile terminal 10, such as, for example, longitudinal and latitudinal directions of the mobile terminal 10, or a position relative to a reference point such as a destination or start point. Information from the positioning sensor 36 may then be communicated to a memory of the mobile terminal 10 or to another memory device to be stored as a position history or location information. In this regard, for example, the position history may define a series of data points corresponding to positions of the mobile terminal 10 at respective times. Various events or activities of the mobile terminal 10 may also be recorded in association with position history or location information provided by the positioning sensor.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10. For example, the memories may include an identifier, such as an international mobile equipment identification (IMEI) code, capable, of uniquely identifying the mobile terminal 10. Furthermore, the memories may store instructions for determining cell id information. Specifically, the memories may store an application program for execution by the controller 20, which determines an identity of the current cell, e.g., cell id identity or cell id information, with which the mobile terminal 10 is in communication.

Figure 2:
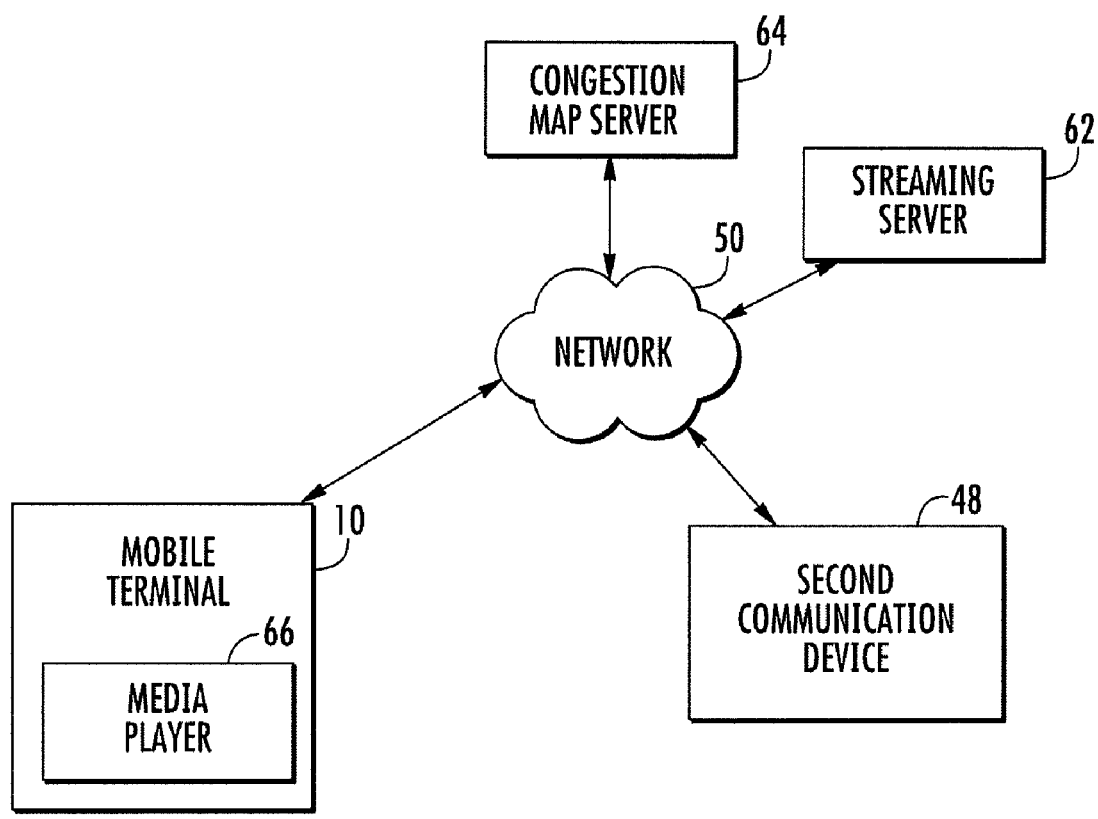
FIG. 2 is a schematic block diagram of a wireless communications system according to an example embodiment of the present invention.

FIG. 2 is a schematic block diagram of a wireless communications system according to an example embodiment of the present invention. Referring now to FIG. 2, an illustration of one type of system that would benefit from embodiments of the present invention is provided. As shown in FIG. 2, a system in accordance with an example embodiment of the present invention includes a first communication device, e.g., mobile terminal 10, and in some cases also a second communication device 48. Both first and second communication devices may be capable of communication with a network 50. The second communication device 48 is provided as an example to illustrate potential multiplicity with respect to instances of other devices that may be included in the network 50 and that may practice example embodiments. The communications devices of the system may be able to communicate with network devices or with each other via the network 50. In some cases, the network devices with which the communication devices of the system communicate may include one or more servers. In an example embodiment, the mobile terminal 10, and/or the second communication device 48, is enabled to communicate with the servers to provide, request and/or receive information. However, in some embodiments, not all systems that employ embodiments of the present invention may comprise all the devices illustrated and/or described herein.

In an example embodiment, the network 50 includes a collection of various different nodes, devices or functions that are capable of communication with each other via corresponding wired and/or wireless interfaces. As such, the illustration of FIG. 2 should be understood to be an example of a broad view of certain elements of the system and not an all inclusive or detailed view of the system or the network 50. Although not necessary, in some embodiments, the network 50 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and the second communication device 48 may be capable of communication with each other via the network 50 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements, e.g., personal computers, server computers or the like, may be coupled to the mobile terminal 10 and the second communication device 48 via the network 50. By directly or indirectly connecting the mobile terminal 10, the second communication device 48 and other devices to the network 50, the mobile terminal 10 and the second communication device 48 may be enabled to communicate with the other devices, or each other, for example, according to numerous communication protocols including Hypertext Transfer Protocol (HTTP) and/or the like, to thereby carry out various communication or other functions of the mobile terminal 10 and the second communication device 48, respectively.

Furthermore, although not shown in FIG. 2, the mobile terminal 10 and the second communication device 48 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 48 may be enabled to communicate with the network 50 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, one or more devices or nodes such as servers or other processing element may also be in communication with the network 50. The servers may have any number of functions or associations with various services. As such, for example, the servers may be platforms such as a dedicated servers, or a server bank, associated with a particular information source or service, e.g., a content streaming service, a geo-predictive feedback service, a mapping service, a routing service and/or a navigation service, or the servers may be backend servers associated with one or more other functions or services. As such, the one or more servers may represent a potential host for a plurality of different services or information sources. In some embodiments, the functionality of the servers is provided by hardware and/or software components configured to operate in accordance with known techniques for the provision of information to users of communication devices. However, at least some of the functionality provided by the servers is information provided in accordance with example embodiments of the present invention.

In an example embodiment, the one or more servers may include a streaming server 62. The streaming server 62 may be any entity such as, for example, a streaming server configured to stream multimedia content to other devices, e.g., a device such as the mobile terminal 10 with a media player. In some cases, the streaming server 62 may include circuitry, e.g., processor and memory storing executable instructions, for enabling the streaming server 62 to perform its corresponding functions. Moreover, in some embodiments, the streaming server 62 may be configured to parse reports, e.g., RTCP extension reports, next application data units (NADU), estimated capacity vectors (ECV) and other messages or data provided thereto, e.g., by the mobile terminal 10 or other servers. The ECV comprises one or more expected channel capacities and corresponding one or more time offsets. An expected channel capacity instance represents the expected channel capacity within a segment of the projected route of the mobile terminal and the corresponding time offset represents the estimated time duration for the mobile terminal to travel the same segment of the projected route. Geo-predictive NADU or GP NADU, e.g., an extension of the 3GPP NADU packet format to include geo-predictive (GP) capability, comprises the total buffer space of the receiving client device, the delta outage buffer space (DOBS), and the buffering compensation time (BCT). The delta outage buffer space (DOBS) represents the expected deficit in the amount of streaming content data due to an outage event. Specifically, DOBS is the deficit in streaming data due to the data network throughput rate being lower than the playback rate within an outage period, or parts of the outage period. The buffering compensation time (BCT) is an estimated time duration during which pre-buffering is to take place in order to compensate for DOBS. The GP NADU may further comprise the time duration of the outage (Tgap), i.e., the duration of period when the available network throughput drops below the playback rate. The GP NADU may comprise the ECV. In other words, the ECV is, for example, embedded within the GP NADU. Alternatively, The GP NADU and the ECV may be communicated to the streaming server 62 as separate transport control protocol application (RTCP APP) packets.

In some embodiments, the service platform 60 may further include a congestion map server 64. The congestion map server 64 may be any entity such as, for example, a mapping server configured to receive location specific network performance parameters, e.g., bandwidth updates, from streaming clients at corresponding different locations in order to determine a location based picture or synopsis of network performance on a per-location basis. In some cases, the congestion map server 64 may include circuitry, e.g., one or more processors and one or more memories storing executable instructions, for enabling the congestion map server 64 to perform its corresponding functions.

In some embodiments, the congestion map server 64 is configured to receive information related to streaming performance from client devices that are currently receiving streaming data. The information related to streaming performance received from one or more client devices may be considered to be context information, e.g., including location information descriptive of the location of the respective client devices, a corresponding time at which the location information is applicable and/or operator details defining network performance parameters. Context updates may therefore include, among other things, information descriptive of operator name, current client device location, available bandwidth, base station ID, signal strength, received streaming throughput and/or other meaningful context information. The congestion map server 64 may be configured to utilize the information above to generate a congestion map on a two dimensional geographical map, e.g., from Google Maps, Nokia Maps, or any other available mapping service. As such, the congestion map may be defined as a function of a set of user context information parameters in which the user context is defined as a function of location details and/or operator details defining network performance parameters. The location details may be provided by the position sensor of each respective client device reporting information to the congestion map server 64.

Figure 3:
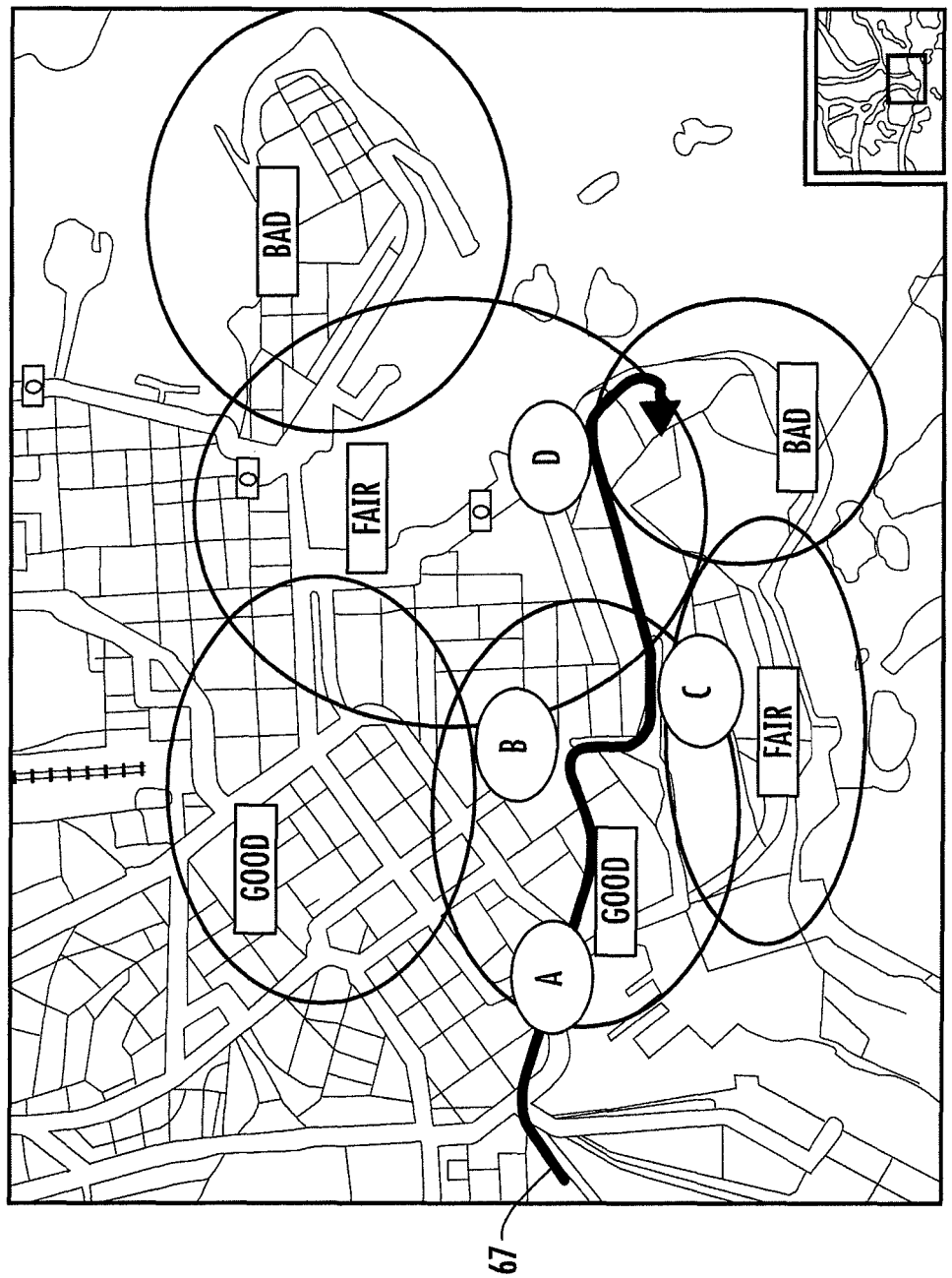
FIG. 3 illustrates a congestion map according to an example embodiment of the present invention.

FIG. 3 illustrates an example of graphical representation of a congestion map. As shown in FIG. 3, a typical geographical map may be overlaid with congestion descriptors, in this example defining good, fair and bad areas, identifying relative congestion in each respective area based on the network performance parameter information received for each respective area from client devices, therein, receiving streaming data. In some embodiments, good areas may be defined as areas with excess bandwidth, or available bandwidth or signal strength above a threshold level, relative to a playback rate that can be supported by the mobile terminal 10, e.g., by media player 66. Fair areas may be defined as areas that have an average available bandwidth that is substantially similar to the playback rate supported by the mobile terminal 10, e.g., within a threshold amount, and/or average signal strength values. Meanwhile, bad areas may be defined as areas that have signal strength and/or bandwidth limitations that suggest that the playback rate supported by the mobile terminal 10 is unlikely to be maintained in such areas, e.g., available bandwidth or signal strength below a threshold level.

Areas with different network performance characteristics may be distinguished, within the graphical representation of the congestion map, via color differences, shading, cross-hatching, or any other overlay techniques. Although the overlay data may overlap in some cases, in other cases the borders between areas with different congestion descriptors may be better defined. As such, finer granularity of detail may be provided in some embodiments. Moreover, in some embodiments, different congestion maps may be provided for different operators or for different times of the day, different days of the year or other historical data rather than real-time data. In some embodiments, route data 67 may also be presented on graphical representation of the congestion map to indicate either the projected route of the mobile terminal 10 or the recorded route the mobile terminal 10 has traveled thus far. Various locations along the route, e.g., indicated by points A, B, C and D FIG. 3, may therefore be analyzed with respect to the expected network performance parameters that will be encountered at each respective location. Accordingly, the periods where maintaining a constant playback rate may become a challenge, e.g., the bad areas such as at point D, may be graphically visible via the congestion map. The congestion map is provided to the mobile terminal 10, for example, in the form of a graphical representation, in the form of an array of performance and/or network parameters with associated locations and/or any other form of information that would convey, to the receiving terminal, the behavior of the expected streaming performance along the terminal route. Potential deficits between the receiver rate that can be supplied, e.g., in bad areas, and the playback rate supported by the mobile terminal 10 may be addressed based on the information provided to mobile terminals.

In some embodiments, direct correlations may be established and used to define relationships between distances and geo-precision. For example, Table 1 below may be employed in one example in order to assist with selection of thresholds for fetching and updating neighborhood locations. The example shows that latitude/longitude coordinates with no decimals yield a precision of approximately 111 km, whereas the same coordinates expressed with more decimals yield a higher precision when expressing a point on the earth, e.g., the use of five decimals can yield a precision up to 1.113 m, offering a finer granularity for identifying a location point.

TABLE 1

Relationship of geo-precision and distances

| Lat/Long geo-precision | distance in meters |
|---|---|
| 0.00001 | 1.113 m |
| 0.0001 | 11.132 m |
| 0.001 | 111.319 m |
| 0.01 | 1113.195 m |
| 0.1 | 11131.949 m |
| 1.0 | 111319.491 m |

Returning now to FIG. 2, the mobile terminal 10 may include a media player 66 or streaming client. The media player 66 may be an entity that is enabled to initiate, receive and playback multimedia content that is provided, for example by the streaming server 62, to the media player 66, or stored locally at the mobile terminal 10 or in some other location accessible to the mobile terminal 10 streaming server. In an example embodiment, the media player 66 may be further configured to generate real time transport control protocol application (RTCP APP) packets such as GP NADU and/or ECV for provision to the streaming server 62.

In an example embodiment, the streaming server 62, the congestion map server 64 and the media player 66 may work together to provide an efficient mechanism by which to adjust media download and buffering to avoid/reduce streaming interruptions due to data outages or times of reduced network bandwidth in certain areas. In this regard, for example, the congestion map server 64 may be configured to determine, and perhaps store, information indicative of current network congestion areas based on feedback provided from a plurality of client devices. The provided feedback comprises client devices locations and streaming parameters of each respective device. As such, the congestion map server 64 may be enabled to build a spatial and temporally oriented database of network capacity. The information on location and time based network congestion may then be used in connection with information regarding the location and projected location of the mobile terminal 10 in order to determine expected times and durations at which outages or data insufficiencies, relative to the streaming or playback rate, are likely to occur. Based on these expected times and durations, the streaming server 62 may adjust delivery rates at a time proximate to the expected times in order to pre-buffer sufficient data to enable the provision of data at the streaming or playback rate throughout the expected times and durations during which outages or data insufficiencies are expected.

Figure 4:
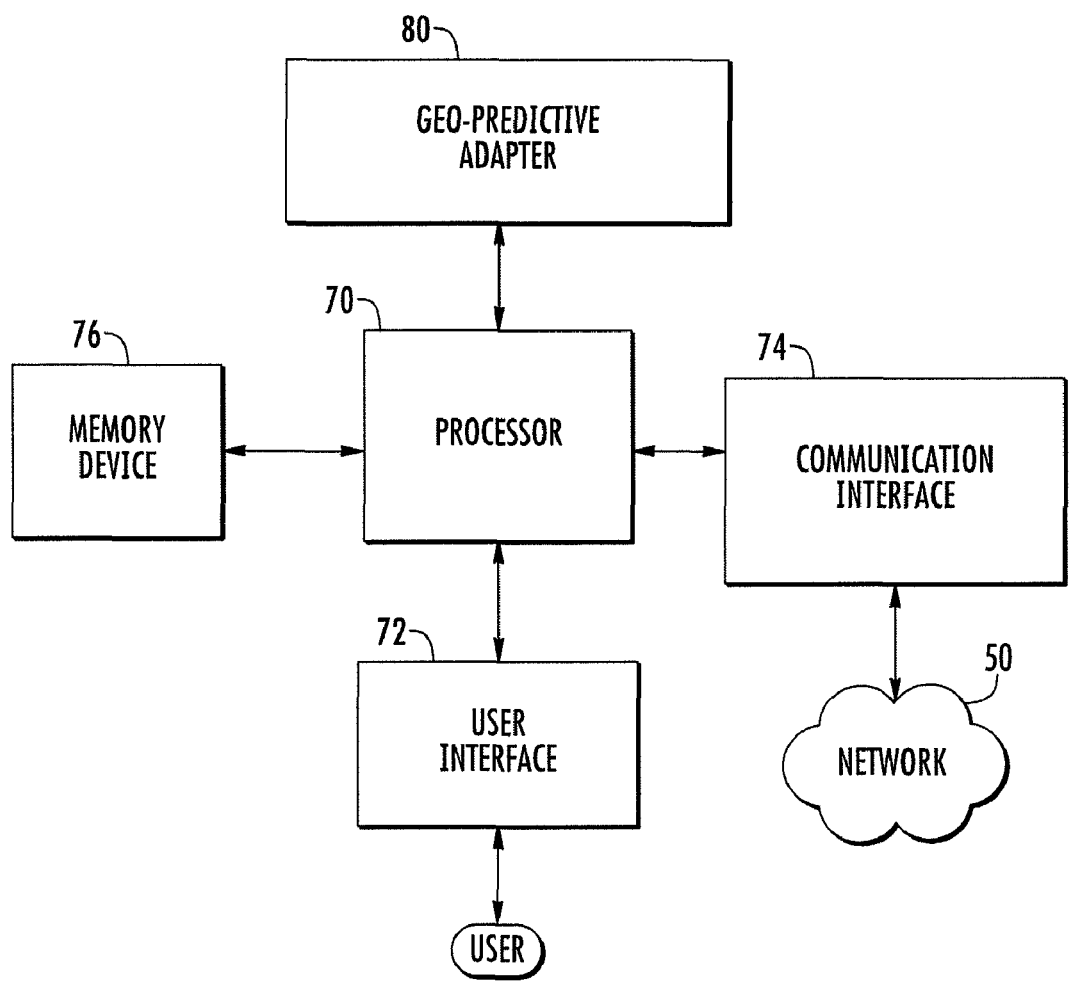
FIG. 4 illustrates a block diagram of an apparatus for providing a geo-predictive streaming service according to an example embodiment of the present invention.

In an example embodiment, the mobile terminal 10 may employ a device configured to interact with the streaming server 62, the congestion map server 64 and the media player 66 to facilitate communications that enable the sharing and use of information among the streaming server 62, the congestion map server 64 and the media player 66 to enable the pre-buffering described above. In this regard, the mobile terminal 10 may employ a geo-predictive adapter 80 configured to manage the interaction described above. FIG. 4 illustrates a block diagram of an apparatus that may be employed at the mobile terminal 10 to host or otherwise facilitate the operation of the geo-predictive adapter 80 according to an example embodiment of the present invention. An example embodiment of the invention will now be described with reference to FIG. 4, in which certain elements of an apparatus for providing geo-predictive streaming services are displayed. The apparatus of FIG. 4 may be employed, for example, on the mobile terminal 10. However, the apparatus may alternatively be embodied at a variety of other devices, both mobile and fixed, such as, for example, any of the devices listed above. In some cases, embodiments may be employed on either one or a combination of devices. Accordingly, some embodiments of the present invention may be embodied wholly at a single device, e.g., the mobile terminal 10 or the second communication device 48, by a plurality of devices in a distributed fashion or by devices in a client/server relationship, e.g., the mobile terminal 10 and the servers 62 and 64.

Referring now to FIG. 4, an apparatus for providing geo-predictive streaming services is provided. The apparatus may include or otherwise be in communication with one or more processors such as processor 70, a user interface 72, one or more communication interfaces 74 and a memory device 76. The memory device 76 may include, for example, one or more volatile and/or non-volatile memories. In other words, for example, the memory device 76 may be an electronic storage device, e.g., a computer readable storage medium, comprising gates configured to store data that may be retrievable by a machine, e.g., a computing device. The memory device 76 may be configured to store information, data, applications, instructions or the like for enabling the apparatus to carry out various functions in accordance with exemplary embodiments of the present invention. For example, the memory device 76 may be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an application specific integrated circuit (ASIC), an field programmable gate array (FPGA), a microcontroller unit (MCU), a hardware accelerator, a special-purpose computer chip, processing circuitry, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity, e.g., physically embodied in circuitry, capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device, e.g., the mobile terminal 10 or a network device, adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna, or multiple antennas, and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device, e.g., the mobile terminal 10, the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions, e.g., software and/or firmware, stored on a memory accessible to the processor 70, e.g., memory device 76, and/or the like.

In an exemplary embodiment, the processor 70 may be embodied as, include or otherwise control the geo-predictive adapter 80. As such, in some embodiments, the processor 70 may be said to cause, direct or control the execution or occurrence of the various functions attributed to the geo-predictive adapter 80 as described herein. The geo-predictive adapter 80 may be any means such as a device or circuitry operating in accordance with software or otherwise embodied in hardware or a combination of hardware and software. The geo-predictive adapter may also be a software application, or a set of software executable instructions, executed for example by processor 70. The corresponding functions of the geo-predictive adapter 80 are performed as described herein.

The geo-predictive adapter 80 may be configured to communicate with the congestion map server 64 to request network performance parameters, e.g., bandwidth updates, for either specific areas to which the geo-predictive adapter 80 determines a likelihood of entry in a given period of time, or for a general area. The geo-predictive adapter 80 may then receive a response, e.g., from the congestion map server 64, to the request. The geographically based network performance parameters information received from the congestion map server 64 may then be used to predict content delivery parameters, e.g., bandwidth, signal strength and/or other parameters, for a planned route or projected route of the mobile terminal 10. The planned or projected route may be determined based on a route for which guidance is currently being provided, based on analysis of stored route data to determine if a current route matches a frequently traveled route, or based on extrapolation of user position based on current direction and speed of travel. As such, for example, if the user is projected or plans to pass through an area with relatively poor content delivery parameters, a time including start time and duration, for which such poor parameters are likely to be applicable, may be determined. A time period during which it is likely that the playback rate cannot be maintained due to loss or reduction in streaming rate for a period of time over which the typical pre-buffering is not sufficient to maintain the playback rate, may be referred to as an outage or outage event. Based on the outage event, and the network content delivery parameters expected to be encountered along the way, the geo-predictive adapter 80 may determine bandwidth excess along the route that may be employed to pre-buffer sufficient data to account for an upcoming outage event. A constant playback rate may be maintained, even while passing through areas in which relatively poor content delivery parameters are applicable, by pre-buffering sufficient amount of streaming data ahead of the outage region.

The geo-predictive adapter 80 may thereafter provide signaling to the streaming server 62 to provide information indicative of content delivery parameters requested to pre-buffer data as indicated above. For example, the geo-predictive adapter 80 may be configured to indicate the time at which increased bandwidth for pre-buffering is desired, requested rates and the duration for which such increased bandwidth for pre-buffering is desired.

In an example embodiment, the geo-predictive adapter 80 may receive positioning information from the positioning sensor 36 in order to determine current location and a projected future location of the mobile terminal 10. As such, the geo-predictive adapter 80 is configured to determine a projected location for the mobile terminal 10, e.g., including a location and a corresponding time at which the mobile terminal is projected to be at the location. In some embodiments, the geo-predictive adapter 80 is configured to generate a projected route including a plurality of corresponding locations and times defining a likely route the user is expected to take given current indications. The current indications, as mentioned above, may include the current location, speed of motion, direction of motion, historical information, route guidance information and/or other available information. The geo-predictive adapter 80 may then compare the projected location of the mobile terminal 10 to network congestion area information provided by the congestion map server 64 to determine areas and corresponding times during which there is a deficit expected between the amount of data already buffered and the data that would be required to continue the current playback rate considering the network congestion of areas that lie along the projected route of the mobile terminal 10. The geo-predictive adapter 80 may then request increased bandwidth for pre-buffering from the streaming server 62 as described above in order to attempt to pre-buffer data at least equivalent to the expected deficit.

Figure 10:
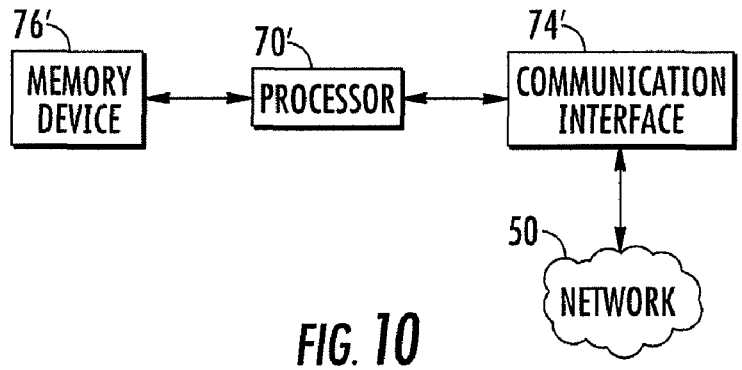
FIG. 10 illustrates a block diagram of streaming server or congestion map server according to an example embodiment of the present invention.

In some embodiments, the congestion map server 64 and/or the streaming server 62 include components such as a processor 70', a memory device 76' and a communication interface 74' as shown in the example of FIG. 10. The processor 70', the memory device 76' and the communication interface 74' may have similar structural characteristics and functional capabilities to the processor 70, memory device 76 and communication interface 74 of FIG. 4 except perhaps as to scale and semantic differences.

Figure 5:
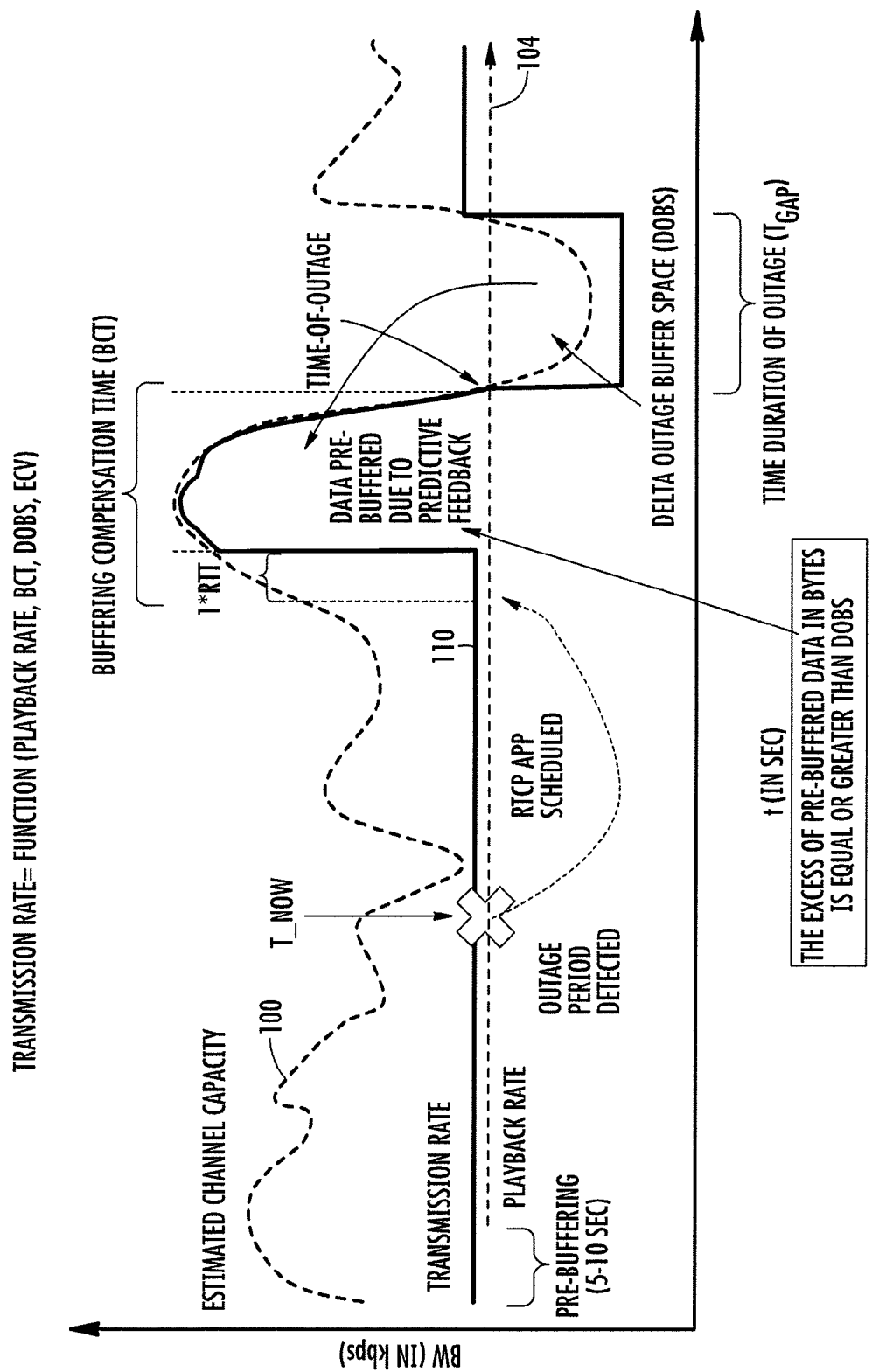
FIG. 5 illustrates scheduling operations associated with provision of geo-predictive feedback and adaptation according to an example embodiment of the present invention.

Operation of an example embodiment will now be described in reference to FIG. 5, which illustrates scheduling operations associated with the provision of geo-predictive feedback and adaptation according to an example embodiment. FIG. 5 illustrates an estimated channel capacity curve 100, which is determined based on the congestion map and the projected route of the mobile terminal 10. FIG. 5 also illustrates a curve of a transmission rate 110 as compared to the playback rate 104 of the media player 66. The playback rate 104 is the bitrate at which received media data is played back by the media player 66. The receiver rate is the bitrate at which media data is received by the mobile terminal 10. In order to allow a user to experience smooth delivery of streaming content, it may be desirable to ensure that sufficient data is buffered to enable maintaining a continuous playback rate 104 even when the receiver rate, calculated from the estimated channel capacity 100, is low due to poor network performance parameters in a particular area. In the illustrative example of FIG. 5, the playback rate 104 is shown to be constant. However, in a different example the playback rate 104 may vary in time. Whether the playback rate 104 is constant or time-varying, example embodiments propose pre-adjusting the transmission rate 110 in a way to allow sufficient buffering of streaming content data, for example, ahead of an area with relatively low network performance. For example, lack of available bandwidth may result in a delta outage buffer space (DOBS), as shown in FIG. 5, that occurs when the estimated channel capacity curve 100 passes below the playback rate 104 for a period that cannot be covered by initial pre-buffering. The delta outage buffer space represents the expected deficit in streaming data content due to an upcoming outage event, e.g. as a result of the mismatch between channel capacity 100 and playback rate 104.

As shown in FIG. 5, pre-buffering may be initially performed, for example for about five to ten seconds, prior to initiation of playback. Using information from the congestion map, the geo-predictive adapter 80 may predict the network throughput at locations along a projected route, e.g., locations coming up in the near future within some threshold amount of time. If the estimated channel capacity expected to be encountered is higher than the current, or the expected, media playback rate, then the media player 66 does not need to buffer additional data. However, if the estimated channel capacity is going to fall below the media streaming or playback rate at some point along the projected route, then the geo-predictive adapter 80 may calculate the time duration of outage. For example, the geo-predictive adapter 80 calculates an expected time of outage and the expected duration of time, Tgap, during which the channel capacity is expected to fall below a desired or optimum media streaming rate, e.g., the playback rate 104. The geo-predictive adapter 80 then schedules a period of increased transmission rate 110 and/or switch the stream or playback rate 104 to a lower rate. Scheduling a period of increased transmission rate 110 includes determining, or looking at, the estimated channel capacity between a current time (T_now) and the time-of-outage and scheduling RTCP APP packets to be sent to the geo-predictive server in order to initiate increase in transmission rate.

To maintain the playback rate 104 continuous, the DOBS must be accounted for by pre-buffering during the period of increased transmission rate 110. By considering the excess channel capacity available, with respect to the expected playback rate, as indicated by the estimated channel capacity curve 100, the geo-predictive adapter 80 may be configured to determine an estimated capacity vector (ECV) to define a buffering compensation time (BCT) during which increased bandwidth resources are being employed for pre-buffering. If the excess of pre-buffered streaming content data equals or exceeds DOBS, it is likely that the playback rate 104 may be maintained even though the receiver rate 102 dips low during the time duration of outage Tgap. In initiating pre-buffering, round trip time (RTT) may be considered as well, to ensure that instructions are received and can be acted on before corresponding events occur. Round trip time (RTT) refers to the time duration needed for signaling between, for example, a mobile terminal and a server or a network entity, and vice-versa, before instructions signaled between the entities are implemented. Thus, the RTCP APP packets, e.g., geo-predictive NADU and/or ECV, may be sent one RTT in advance of the start of the buffering compensation time (BCT).

Figure 6:
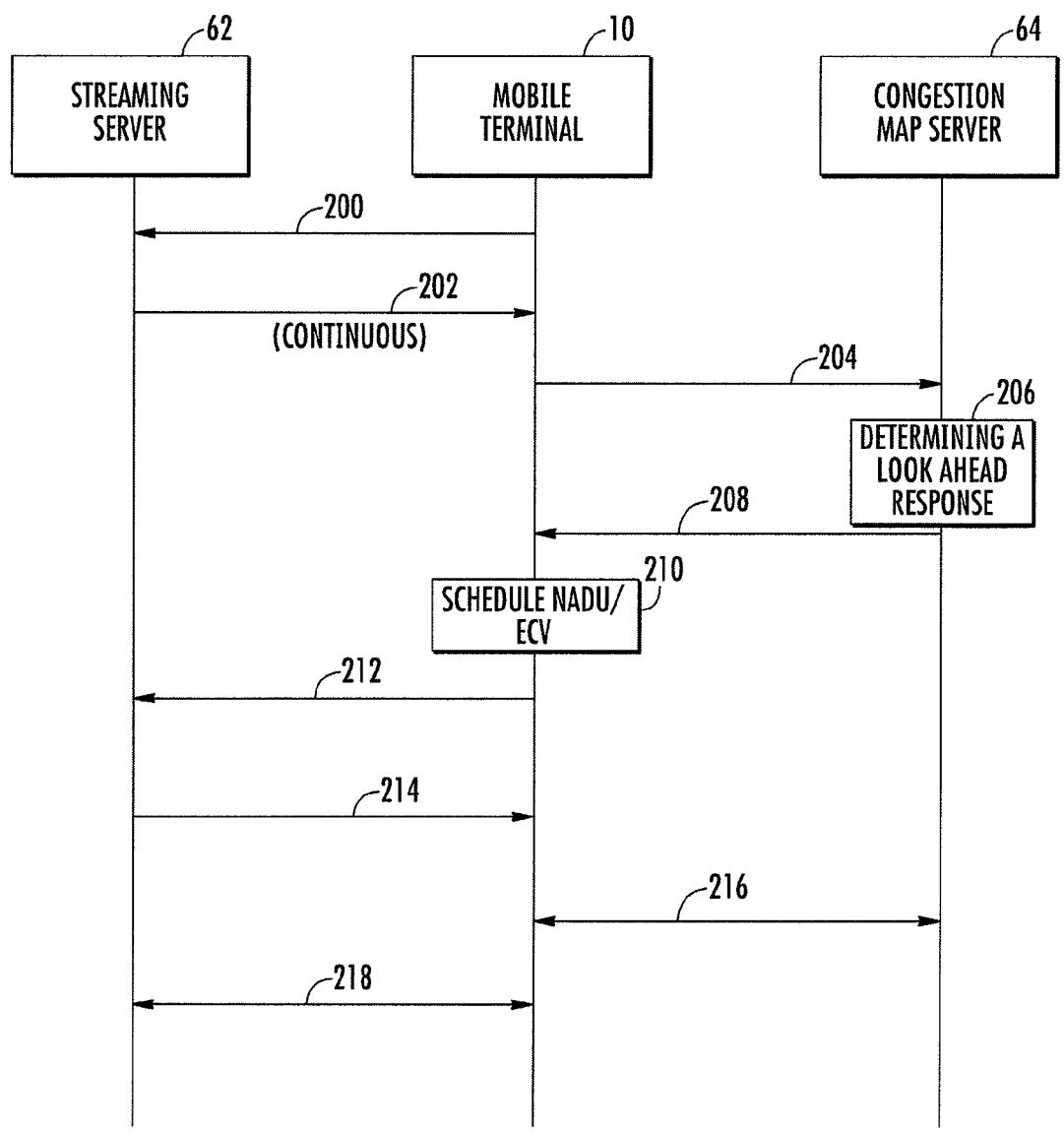
FIG. 6 illustrates a control flow diagram showing signaling flow between different entities involved in providing services according to an exemplary embodiment of the present invention.

FIG. 6 illustrates a control flow diagram showing signaling flow between different entities involved in providing services according to an exemplary embodiment. As shown in FIG. 6, the mobile terminal 10, e.g., a client device receiving streaming content, may initiate a session with the streaming server 62 at operation 200 and the streaming server 62 may begin to stream media content data, e.g., real time protocol (RTP) media data, to the mobile terminal 10 at operation 202. At operation 204, the mobile terminal 10 may request information associated with a congestion map. For example, the mobile terminal 10 may issue a "look ahead request" providing information to the congestion map server 64 and request network performance feedback for areas to which the projected route of the mobile terminal 10 is heading. In some examples, the mobile terminal 10 provides information indicative of the mobile terminal's current location, direction or trajectory, and/or the like. The mobile terminal 10 also requests neighborhood or other geographic area information for areas through which the mobile terminal 10 is projected to pass in a given time frame. The congestion map server 64, at operation 206, determines a look ahead response to the look ahead request. The look ahead response is provided to the mobile terminal 10 at operation 208 as congestion map information. In this regard, the congestion map server 64 may generate and/or update a congestion map for provision to the mobile terminal 10 or the congestion map server 64 may simply provide an indication of network performance parameters likely to be encountered based on the projected route of the mobile terminal 10. As such, the congestion map information may provide an array of future locations with corresponding channel throughputs for each location either in a tabular form, or as determinable from the congestion map itself. In some embodiments, if an outage period is detected, complete outage information may be sent. However, if no outage period is detected, then only neighborhood information may be sent.

At operation 210, the mobile terminal 10 schedules geo-predictive NADU and/or ECV to be transmitted to the streaming server 62. The scheduling includes estimating the time at which geo-predictive NADU and/or ECV are to be transmitted based at least in part on buffering compensation time. The RTCP APP packets, e.g., geo-predictive NADU and/or ECV, are then communicated to the streaming server 62 at operation 212 to perhaps schedule a period of increased bandwidth consumption to pre-buffer streaming content data in order to compensate for the amount of data deficit due to the upcoming outage event. In some cases, if pre-buffering is not possible or desirable, the playback rate may be decreased instead, e.g., by switching to a lower media bit rate stream. At operation 214, the streaming server may either provide pre-buffer data or provide a stream switched to a lower rate. In some situations, the streaming server 62 may employ a transmission rate and stream switch algorithm or the processor of the streaming server 62 may execute other functionality associated with determining whether sufficient capacity exists to offset DOBS with higher transmission rate. If there isn't sufficient capacity, the streaming server determines a lower bit stream rate that can be provided. After operation 214, further look ahead requests may be issued and responded to as indicated by arrow 216. Additionally, further communications between the mobile terminal 10 and the streaming server 62 regarding geo-predictive NADU and/or ECV with corresponding media provision may be accomplished as indicated by arrow 218.

A more detailed discussion of signaling mechanisms employed in connection with some example embodiments will now be provided by way of example and not of limitation. In some embodiments, at least three general types of signaling messages may be defined including location specific updates, look ahead requests and look ahead responses. Location-specific updates may include messages sent from mobile devices and their corresponding streaming clients to the congestion map server 64 to update congestion maps or other congestion map information periodically. Look-ahead requests may include messages sent from the mobile terminal 10, e.g., via the geo-predictive adapter 80, to the congestion map server 64 to fetch or otherwise request network performance parameters, e.g., bandwidth predictions of future locations along a projected route or path. The path maybe known or unknown depending on the use-case. Look-ahead responses may include messages that are responses to look-ahead requests and contain congestion map information sent from the congestion map server 64 to the mobile terminal 10.

In an example embodiment, location-specific updates may be sent periodically or whenever the mobile terminal 10 arrives at a new location. However, in some alternative embodiments, location-specific updates may be sent in-bulk when a session is otherwise idle or when very good channel conditions exist. Each location update may include, for example, operator name and current position, e.g., latitude and/or longitude. Latitudes may vary from −90, +90 while longitudes may vary from −180, 180, represented in decimal format. Location updates may also include, for example, a current radio signal strength indicator, e.g., measured in percent or decibels, average throughput, e.g., available at the client since the last location update, measured in kbps, trajectory of the user, e.g., measured in angle, direction of the user, e.g., measured according to cardinal points, speed of user, e.g., measured in standard speed measurement units, age, e.g., of the information as indicated on a timestamp, and/or the like. A message format for a congestion map update (CMUP) is provided as an example in FIG. 7. On receiving CMUP updates, the congestion map server 64 may be configured to use a simple moving average to update a pre-existing value at a corresponding location.

A look ahead request may be a query that the mobile terminal 10 provides to the congestion map server 64 to request network neighborhood connectivity details, e.g., network performance parameters for a local area or an area expected to be encountered within a given period of time. A first look-ahead is typically sent by the mobile terminal 10 in response to starting a new session. If the mobile terminal 10 has no prior information saved for a particular neighborhood location, the mobile terminal 10 may wait until the congestion map information for nearby locations is received from the congestion map server 64 before predictive rate-control can be initiated. In some embodiments, whenever the current position of the user changes, the mobile terminal 10, e.g., via the geo-predictive adapter 80, may actively request bandwidth information for neighborhood locations or other areas to be encountered based on the projected route of the mobile terminal 10. In some cases, rather than bulk downloading the congestion map information (CMIN), the mobile terminal 10 may request information using a sliding-window technique.

The look ahead request, or Congestion Map Look-Ahead (CMLA), may include information such as the operator name, current position, trajectory of the user, direction of the user, speed of the user and/or a look ahead distance. The look ahead distance may express an amount of CMIN data that the mobile terminal 10 desires to receive in the response. The look ahead distance can be expressed in space or time dimensions. For example, by indicating 1 km, the mobile terminal 10 may indicate a desire to obtain CMIN data for the next 1 km path for the given trajectory and direction. As another example, by indicating 30 seconds, the mobile terminal may indicate a desire to obtain CMIN data for the next 30 seconds along the current path for the given trajectory, direction and speed of the user.

Congestion map information (CMIN) may be sent from the congestion map server 64 to the mobile terminal 10. CMIN may be embedded into a look ahead response as a reply to a client look ahead request. The CMIN may include network information about future locations in a particular area or neighborhood. CMIN may in some cases be a vector and include a list of information defining expected channel capacity at locations along the requested or projected route specified by the look ahead query. For example, the congestion map server 64 may send available bandwidth details along a requested 5 km path for a user traveling at 60 km/h on a given trajectory and direction and operator network. When using neighborhood details, the geo-predictive adapter 80 may be enabled to determine beforehand when link capacity drops below streaming requirements, and therefore be in a better position to request for additional media data beforehand. In some embodiments, each element of the CMIN vector may include information such as future location, e.g., in latitude/longitude, and expected channel capacity, e.g., measured in kbps. FIG. 8 shows an example message format for CMIN according to an example embodiment.

As indicated above, in some embodiments, the congestion map server 64 may be configured to execute a look ahead algorithm. To minimize the likelihood that pre-buffering is undertaken unnecessarily, e.g., due to route changes to areas that do not have bad characteristics or due to timing delays along a route, it may be desirable to schedule looking ahead as late as possible to try to exploit estimated channel capacity and get more consistent throughput values near outage areas over time. Accordingly, in response to receiving a look ahead request at the congestion map server 64, the speed, trajectory, direction, current user location and look-ahead distance may be referenced. Based on these factors, and/or other information such as historical route information or route guidance information for a route currently being guided, the congestion map server 64 may determine the projected route. The congestion map server 64 may then also extract the estimated channel capacity for each future location along the projected route, e.g., at a predetermined distance or time interval. The estimated channel capacities may be updated values based on data provided from streaming clients associated with other terminals. The congestion map server 64 may then generate CMIN and send the CMIN to the mobile terminal 10, as one example of a streaming client. The geo-predictive adapter 80 of the mobile terminal 10 may then parse through the dataset provided to determine whether any outage periods are likely to be encountered along the projected route, e.g., DOBS. The geo-predictive adapter 80 may then schedule geo-predictive NADU messages and ECV packets for communication to the streaming server 62.

When communicating with the streaming server 62, the geo-predictive adapter 80 may provide signaling or messages including extensions to 3GPP NADU formatted packets that include geo-predictive elements as described herein and ECVs. The ECVs, which comprise estimated capacity values and corresponding estimated time offsets, are determined by the geo-predictive adapter. The ECVs are provided as a type of APP packet that is usually used to adapt the streaming server 62 to provide a period of increased transmission rate to account for DOBS. The ECVs may also be embedded in the GP NADU. In an example embodiment, the outage period may be defined as a period during which the available link capacity drops below the playback rate. In an example case, the time duration of outage (Tgap) is the duration of period during which the available link capacity drops below the playback rate. In case the start and/or the end of the outage period are to be signaled by the mobile terminal to the streaming server, the time duration for signaling may be incorporated in the time duration of outage (Tgap). For example if the mobile terminal is to send PAUSE message, before the outage occurs, to the streaming server, that may add a signaling duration of 0.5*RTT. Meanwhile, 1*RTT may be required when sending a PLAY command after the end of an outage period. In other words, it takes 1 RTT for receiving media data from the server again. Pausing the streaming is optional. For example if in the outage region, the streaming server may still transmit data a low data transmission rate, the streaming may continue with low data transmission rate and no pause is applied. Similarly the PLAY message is also optional.

Based on the CMIN, received from the congestion map server, the mobile terminal generates the ECV. The CMIN comprises estimated channel capacities and corresponding locations at which the estimated/expected channel capacities apply. The ECV comprises all or some of the estimated channel capacities in CMIN and time offsets associated with the estimated channel capacities. The time offsets are estimated time durations for the mobile terminal to move from one location to the next on the projected route. The mobile terminal, for example, uses distances between the locations indicated in CMIN and speed information, of the mobile terminal, to estimate/calculate the time offsets. Once the time offsets are calculated/estimated, the Delta Outage Buffer Space (DOBS) is then estimated/calculated, for example, based on the estimated channel capacities and corresponding time offsets associated with the outage region. For example, DOBS may be estimated/calculated by subtracting the estimated amount of data needed for playback in the outage region from the sum of channel capacities, within outage region, multiplied by corresponding time offsets. That is DOBS=(playback rate*Tgap)−sum (ECC[i]*t[i]) if play back rate is expected to be constant in the outage region. The term ECC[i] represents an instance of an estimated channel capacity with index i and the term t[i] represents the corresponding time offset. If play back rate is changing, a more accurate estimation may be applied by accounting for the variation in the playback rate. In estimating DOBS an error term may be added to compensate, for example, for errors in estimated channel capacities, error in playback rate, error in time offsets and/or the fact that transmission rate within the outage region may be below estimated channel capacities. DOBS may be expressed in bits or bytes or in some other suitable units. If DOBS is >0 there is an outage event. In order to signal a buffer expansion, the receiver (e.g., the mobile terminal 10) may utilize the NADU Free Buffer Space (FBS) field to signal the use of additional buffer space in the receiver buffer. As an example, the FBS may signal in the 3GPP NADU packet, New_FBS=DOBS−FBS. Alternatively, the DOBS may be signaled to the streaming server 62 using another suitable transport protocol.

In an example embodiment, by signaling a need for additional buffer space from the mobile terminal 10 to the streaming server 62, the streaming server 62 may be aware of how much extra data needs to be filled in at the receiver buffer in order to keep it in a healthy condition to permit uninterrupted playback. When using the look ahead procedures described herein, the receiver may be able to gauge by reading the vector CMIN when the outage will occur, taking into account the user speed when reading the vector. As such, the buffering compensation time (BCT), indicates an estimated amount of time for pre-buffering before the outage event starts. The BCT can be signaled to the streaming server 62 using any suitable protocol. Since BCT is a function of speed, in cases where speed changes, the mobile terminal 10 may be enabled to signal an updated BCT to the streaming server 62 in order to update the old BCT value.

Additionally, in order to avoid losses during the outage period, the receiver may calculate a Time To Pause (TTP) value, defining an instant slightly before when the outage will occur. The mobile terminal 10 may send an RTSP PAUSE signal to the streaming server 62 to pause the data stream at the TTP instant. After the reception of the PAUSE message the streaming server 62 may not send any more data until a PLAY signal is received. The receiver may then send a PLAY signal when the Time Duration of Outage expires. Accordingly, the streaming server 62 may be enabled to determine encoding and transmission rates to be employed based on the information received, which are the FBS (or DOBS) and the BCT. The BCT may indicate the relative urgency that the streaming server 62 must have when filling the buffer, whereas DOBS may be indicative of the amount of extra data that must be delivered within the BCT time.

Accordingly, for example, the geo-predictive NADU packet, may include fields such as a total buffer space, DOBS and BCT. The GP NADU may further include the time duration of the outage, e.g., Tgap. The GP NADU may include the ECV. In other words, the ECV is communicated to the streaming server 62, for example, within the GP NADU. The total buffer space defines a total buffer space of the media player 66 in the mobile terminal 10. The total buffer space may be an enlarged buffer space due to the need for extra buffering to compensate for expected data deficit in the area of outage. DOBS defines an estimated amount of data deficit during the outage period and therefore the amount of filled buffer space needed in order to compensate for the outage. BCT defines the time duration between the sending of the geo-predictive NADU message and the time when the outage begins, e.g., time of outage. When scheduling the sending of the geo-predictive NADU, the actual schedule may take into account that it will take 1*RTT in order for the message to be received and for the server to take an appropriate action. Accordingly, it may be advisable to schedule the sending of the RTCP APP geo-predictive NADU 1*RTT earlier than BCT. Alternatively, the 1*RTT may be included in the BCT so that BCT is the estimated time duration for pre-buffering plus 1*RTT.

Due to collaboration between the mobile terminal 10, e.g., the geo-predictive adapter 80, and the congestion map server 64, the mobile terminal 10 may be aware of throughput variations to be expected over the projected route, because the mobile terminal 10 received information in the CMIN vector. However, this information may generally not otherwise be known to the streaming server 62 especially if ECV is not communicated to streaming server 62. The streaming server 62 may use a new defined average transmission rate to attempt to compensate for a future outage. The streaming server 62 may further adjust/modify the transmission rate 110 based on, for example, feedback control information received from the mobile terminal 10. Unfortunately the average new transmission rate cannot be guaranteed as the channel capacity is varying throughout time. Therefore, the streaming server 62 is generally unaware of the filling rate, e.g., how quickly it should be filling the receiver buffer in the mobile terminal 10 at the different stages of the fast filling process until the ECV is provided. In other words, the streaming server 62 needs to know what is the future transmission rate it can use for fast filling the receiver buffer in the mobile terminal 10 and how long it can use that transmission rate.

Based on the CMIN vector, the mobile terminal calculates parameters such the delta outage buffer space (DOBS), the expected time of outage, the location of outage, the time duration of outage Tgap given the variable network bandwidth reported in CMIN with corresponding locations, the media playback rate and/or the speed information of the mobile terminal. The mobile terminal receives from the congestion map server 64, for example, a CMIN vector including N elements. Let the vector of locations be already sorted from closest location to furthest locations according to the estimated streaming client, or mobile terminal, route. For example, the vector index 1 represents the closest location to the streaming client, whereas the vector index N represents the furthest location from the streaming client. The streaming client scans the CMIN vector in the forward direction, e.g., from closest location towards the furthest location. If an outage period does not exist in the CMIN vector, then the mobile terminal terminates the geo prediction process and waits for the next scheduled fetching of CMIN data according to the current speed and route. If an outage period exists in the CMIN vector, then by taking into account the current speed, the streaming client calculates the instant when the time-of-outage is expected to occur based on a detected location of outage and the speed information. The streaming client, e.g. mobile terminal 10, also calculates the time duration of outage Tgap based on, for example, the distances between consecutive locations of outage and the speed information. The streaming client, e.g., mobile terminal 10, also calculates DOBS. DOBS may be calculated based on estimated channel capacities of projected route segments within the outage region and the corresponding time offsets. The time offsets represent the estimated time durations for the mobile terminal 10 to travel the corresponding route segments. The time offsets are, for example, estimated based on the length of the route segments and the speed information of the mobile terminal. The speed information, for example, includes current speed of the mobile terminal and/or expected speeds in projected route segments. The expected speeds in projected route segments may be provided, for example, by a global positioning system (GPS) device. The mobile terminal 10, also calculates the buffering compensation time BCT which is the estimated pre-buffering time duration sufficient to compensate for the data deficit due to the upcoming outage.

To provide the streaming server 62 with complete future channel conditions according to a scheduling method of an example embodiment, the mobile terminal 10 may decompose the CMIN vector received from the congestion map server 64 into temporal information by using the user's current speed and distance between future locations. The mobile terminal 10, e.g., again via the geo-predictive adapter 80, may cause the communication of a subset of information of the CMIN vector to the streaming server 62 as an array of information defining the ECV. To determine the ECV, the geo-predictive adapter 80 may be configured to estimate the time at which the time-of-outage will occur based on the CMIN location information and the current speed. The corresponding location of outage may also be known from the CMIN vector. Let a parameter C be equal to zero. The geo-predictive adapter 80 may also read the CMIN vector elements in a backward direction from the location of outage, e.g., proceeding from the location indicating start of outage to the nearest location. Each CMIN vector element may carry an expected channel capacity value ECC[i]. For a given mobile terminal speed, the geo-predictive adapter 80 may determine the time offset t[i], which is the time duration the expected channel capacity t[i] will hold in the network. If the expected channel capacity ECC[i] is expressed in kbps, then the parameter C is updated as C=C+((ECC[i]−playback rate)*t[i]*1000/8) until C equals, or closely approximates, DOBS. According to this formulation, C is a bytes counter. This procedure allows also the estimation of minimum BCT by summing up the corresponding time offsets t[i]. In other words, assuming that transmission rate would be equal to estimated channel capacities, the procedure estimates the minimum possible period for pre-buffering before the outage period starts. In estimating the BCT, the mobile terminal may account for estimation errors in the expected channel capacities, estimation error in the playback rate, the fact that the transmission rate 110 may be less than the expected channel capacities and/or other factors. The <ECC[1], t[1]>, <ECC[2], t[2]>, . . . , <ECC[n], t[n]> may be transmitted to the streaming server 62, as ECV, using a suitable protocol such as RTCP. The vector/array, ECV, may also be compressed in a suitable manner before transmission. Accordingly, the ECV includes an estimated channel capacity and a time offset for each corresponding vector element, for example with index i of the ECV message. As an example, if the ECV is transmitted to the streaming server 62 with the following values, perhaps among, . . . <45,3>, <64, 4> . . . , it means that the streaming server 62 can transmit up to 45 kbps of data for 3 seconds, and subsequently transmit up to 64 kbps for 4 seconds, etc. The information in the ECV may be communicated via RTCP APP packets or any other suitable manner. For example, the ECV may be communicated within the GP NADU. Using the information in DOBS, BCT and ECV, the streaming server 62 may be enabled to determine transmission rate and/or stream switching decisions accurately.

To update the time offsets of an existing ECV at the streaming server 62 because the user speed changed in non negligible way, the mobile terminal 10 may provide the streaming server 62 with a speed factor, so that the time offsets can be resealed accordingly based on the speed factor. In such examples, an updated speed factor may define a ratio between the velocity when the ECV was generated and the current velocity of the user. In response to receiving a message including an updated speed factor, the streaming server 62 may be enabled to update, on the fly, the time offsets in the ECV. For example, if the user speed was 60 km/h at the time of sending the ECV and the new speed is 90 km/h, the Updated Speed Factor transmitted may be equal to 0.66. Upon reception of the updated value the streaming server 62 may multiply the updated value with the time offsets. In the example above, the two time offsets would change to 2 and 2.66 seconds. The updated speed factor may be transmitted via RTCP or any other suitable protocol.

Responsive to receipt of the geo-predictive NADU and ECV packets, scheduling of data provision may be accomplished. In this regard, using the predicted bandwidths and optimal media-rate the geo-predictive adapter 80 may be enabled to calculate the period of outage (Tgap) and the buffering compensation time (BCT). Using the geo-predictive NADU, the geo predictive adapter 80 may be enabled to cause the communication of an indication of the extra buffer space needed. Along with the knowledge of BCT the streaming server 62 may therefore be enabled to determine the new bandwidth.

The mobile terminal 10, depending on the situation, may choose to signal the GP-NADU at the time of detection of the outage, less stress on the link, or at a later time when appropriate. Signaling the GP-NADU at a later time allows avoiding unnecessary signaling, for example, if the user switches to a new content. The predictive bandwidth information from the mobile terminal 10 may be transferred to the streaming server 62 via ECV messages. The ECV and geo-predictive NADU RTCP messages may also be scheduled one RTT before arriving at the scheduled location. Accordingly, the streaming server 62 may be enabled to correctly change the transmission rate. Furthermore, if BCT is insufficient to transmit all the information needed during the period of outage, the streaming server 62 may switch down to a lower media rate. In some cases, the remaining length of a video or audio content that is being streamed may be taken into account while making decisions with respect to increasing the transmission rate. Additionally, if the mobile terminal 10 has scheduled multiple RTCP messages for conveying geo-predictive NADU and ECV information, and the speed of the user determines the rescheduling of the next RTCP message of the above type, also the subsequent already scheduled RTCP messages of the same type may be rescheduled.

Accordingly, some embodiments of the present invention provide for a mechanism by which to track on a geographic basis, network performance parameters. The network performance parameters may then be provided in response to look ahead requests issued by specific mobile terminals that are traveling in a particular area. A mobile terminal may therefore be provided with congestion map information descriptive of network performance parameters along a projected route of the mobile terminal. The mobile terminal can determine the time and/or location at which a possible deficit situation may exist in which streaming data rates are likely to be encountered that are insufficient to keep up with a current playback rate. The mobile terminal may then schedule a period of increased resource consumption to build up data or pre-buffer data of an amount sufficient to cover the deficit.

Figure 9:
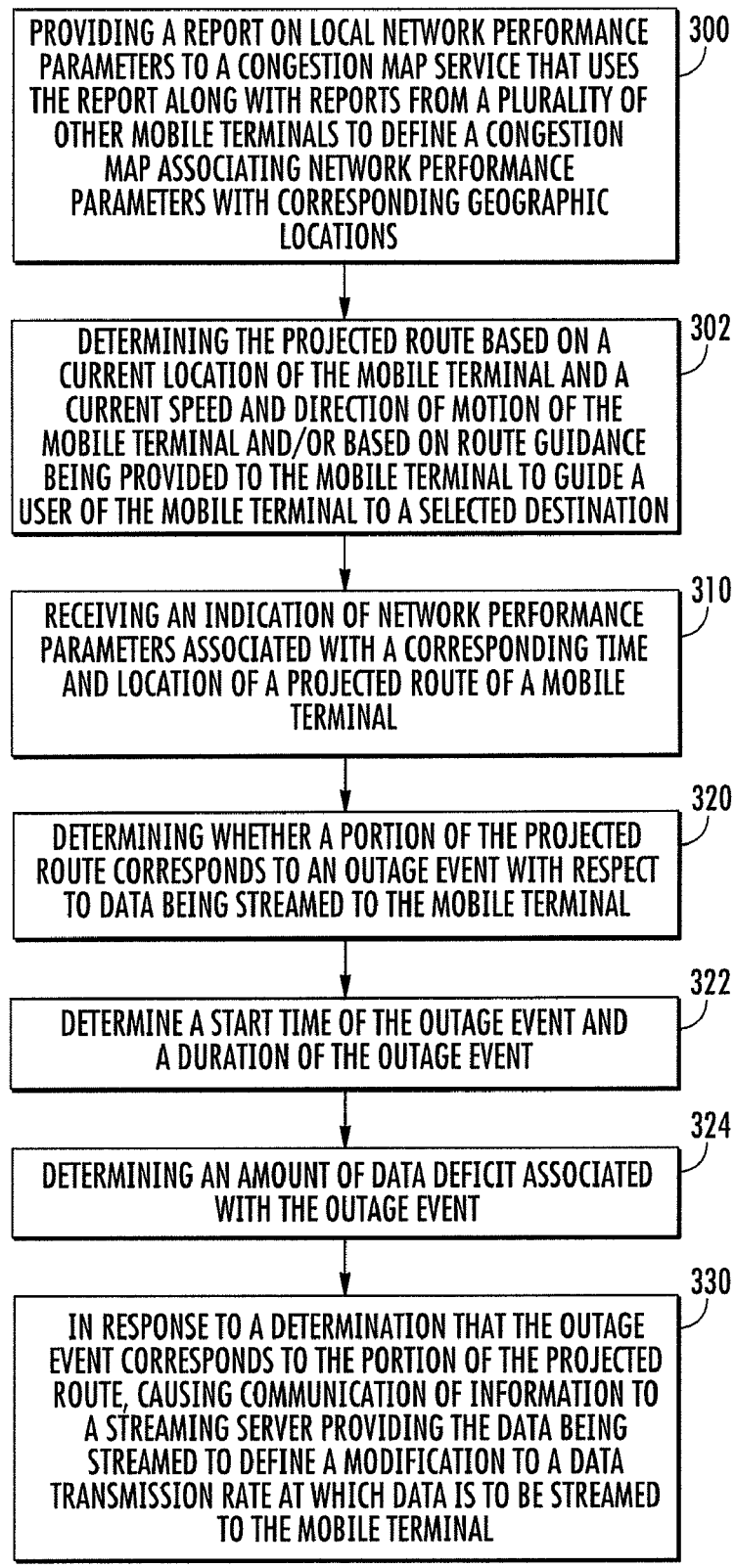
FIG. 9 is a flowchart according to another example method for providing a geo-predictive streaming service according to an example embodiment of the present invention.
Figure 11:
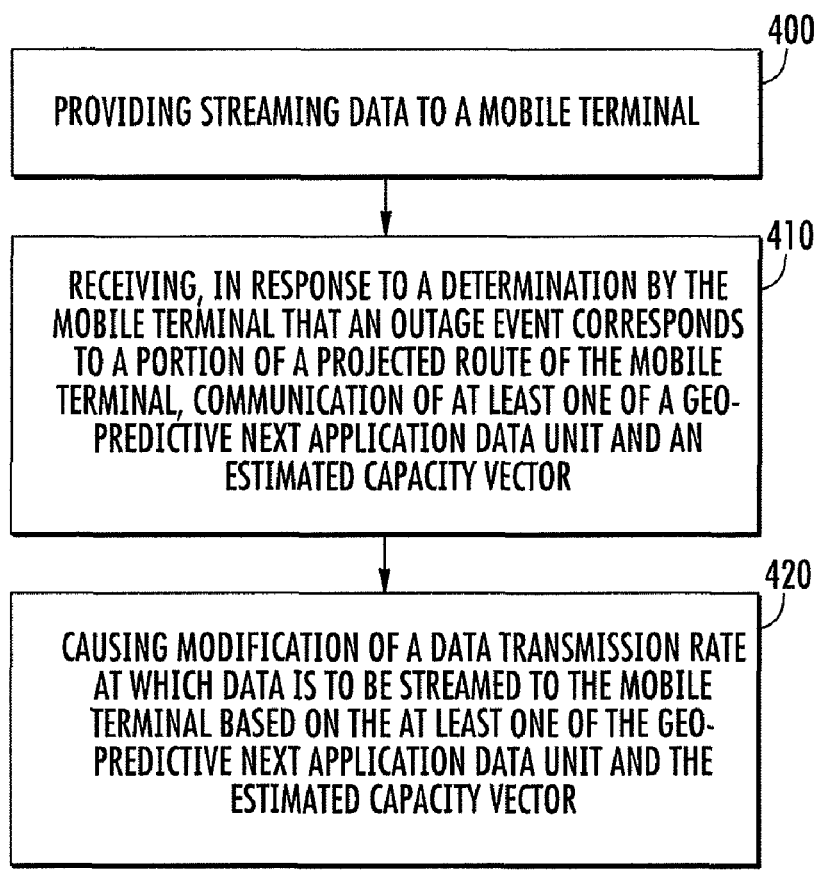
FIG. 11 is a flowchart according to another example method for facilitating provision of a geo-predictive streaming service according to an example embodiment of the present invention.

FIGS. 9 and 11 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus, e.g., hardware, to produce a machine, such that the instructions which execute on the computer or other programmable apparatus create means for implementing the functions specified in the flowcharts block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, a method according to one embodiment of the invention, as shown in FIG. 9, may include receiving, e.g., at a mobile terminal, an indication of network performance parameters associated with a corresponding time and location of a projected route of the mobile terminal at operation 310 and determining, e.g., via a processor, at the mobile terminal, whether a portion of the projected route corresponds to an outage event with respect to data being streamed to the mobile terminal at operation 320. The method may further include, in response to a determination that the outage event corresponds to the portion of the projected route, causing communication of information, e.g., at least one of a geo-predictive next application data unit and an estimated capacity vector, to a streaming server providing the data being streamed to cause a modification to a data transmission rate at which data is to be streamed to the mobile terminal at operation 330. As such, in this example, not only does the mobile terminal, e.g., the streaming client, request a modification to the rate, but the modification itself is actually defined by the mobile terminal. Thus, the streaming server, e.g., the streaming server 62, does not merely alter the rate of streaming without knowledge of specific goals or limitations that may correspond to the request, but the streaming server may actually be made aware of the timing and quantity requirements associated with adjusting the rate. The geo-predictive next application data unit may include a total buffer space, an amount of data deficit associated with the outage event, and a buffering compensation time. The estimated capacity vector may include at least one expected channel capacity and at least one time offset corresponding to said at least one expected channel capacity.

In some embodiments, certain ones of the operations above may be modified or further amplified as described below. Moreover, in some embodiments additional optional operations may also be included, some examples of which are shown in dashed lines in FIG. 9. It should be appreciated that each of the modifications, optional additions or amplifications below may be included with the operations above either alone or in combination with any others among the features described herein. As such, each of the optional operations is combinable with operations 310, 320 and 330 either alone or with one, more than one, or all of the other optional operations in any combination. In an example embodiment, the method may further include providing a report on local network performance parameters to a congestion map server that uses the report along with reports from a plurality of other mobile terminals to define a congestion map associating network performance parameters with corresponding geographic locations at operation 300. In some embodiments, the method may further include determining a time of onset of the outage event and a duration of the outage event at operation 322 and/or determining an amount of data deficit associated with the outage event at operation 324. In some cases, causing communication of the information may include requesting an increase in the rate such that data at least equivalent to the amount of data deficit is to be received prior to the time of onset of the outage event. Moreover, in some cases, requesting the increase in the data rate may include determining a time for initiation of the increase in the rate such that a period during which the increase in the rate is applicable occurs proximate to the onset of the outage event. In an example embodiment, requesting the increase in the data rate may include defining the request based on expected channel capacity values corresponding to areas along the projected route that are encountered prior to a time of onset of the outage event. In some embodiments, the method may further include determining the projected route based on a current location of the mobile terminal and a current speed and direction of motion of the mobile terminal and/or determining the projected route based on route guidance being provided to the mobile terminal to guide a user of the mobile terminal to a selected destination at operation 302.

In an example embodiment, an apparatus for performing the method of FIG. 9 above may comprise a processor (e.g., the processor 70) configured to perform some or each of the operations (300-330) described above. The processor may, for example, be configured to perform the operations (300-330) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-330 may comprise, for example, the processor 70, the geo-predictive adapter 80, and/or a device or circuit for executing instructions or executing an algorithm for processing information as described above.

In an example embodiment according to FIG. 11, a method of facilitating provision of a geo-predictive streaming service is provided. The method may include providing streaming data to a mobile terminal at operation 400 and receiving, in response to a determination by the mobile terminal that an outage event corresponds to a portion of a projected route of the mobile terminal, communication of at least one of a geo-predictive next application data unit and an estimated capacity vector at operation 410. The method may further include causing modification of a data transmission rate at which data is to be streamed to the mobile terminal based on the at least one of the geo-predictive next application data unit and the estimated capacity vector at operation 420. The geo-predictive next application data unit comprises a total buffer space, an amount of data deficit associated with the outage event, and a buffering compensation time. The estimated capacity vector comprises at least one expected channel capacity and at least one time offset corresponding to the at least one expected channel capacity.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, at a mobile terminal, an indication of network performance parameters associated with a corresponding time and location of a projected route of the mobile terminal;
   determining, at the mobile terminal, whether a portion of the projected route corresponds to an outage event with respect to data being streamed to the mobile terminal; and
   in response to a determination that the outage event corresponds to the portion of the projected route, causing communication of at least one of a geo-predictive next application data unit and an estimated capacity vector to a streaming server, providing the data being streamed, to cause a modification to a data transmission rate at which data is to be streamed to the mobile terminal, wherein the geo-predictive next application data unit comprises a total buffer space, an amount of data deficit associated with the outage event, and a buffering compensation time, and wherein the estimated capacity vector comprises at least one expected channel capacity and at least one time offset corresponding to said at least one expected channel capacity.

2. The method of claim 1, further comprising:
providing a report on local network performance parameters to a congestion map server that uses the report along with reports from a plurality of other mobile terminals to define a congestion map associating network performance parameters with corresponding geographic locations.

3. The method of claim 1, further comprising transmitting updated speed information of the mobile terminal to the streaming server, said updated speed information being used by the streaming server to adjust one or more of said buffering compensation time period and said at least one time offset corresponding to said at least one expected channel capacity.

4. The method of claim 1, further comprising at least one of:
determining a starting time of the outage event,
determining a duration of the outage event, and
determining an amount of data deficit associated with the outage event.

5. The method of claim 4, wherein causing communication of the information includes requesting an increase in the data transmission rate such that data at least equivalent to the amount of data deficit is to be received prior to the starting time of the outage event.

6. The method of claim 5, wherein requesting the increase in the data transmission rate further comprises determining a time for initiation of the increase in the rate such that a period during which the increase in the rate is applicable occurs proximate to the start of the outage event.

7. The method of claim 5, wherein requesting the increase in the data transmission rate further comprises defining the request based on expected channel capacity values corresponding to areas along the projected route that are encountered prior to a time of onset of the outage event.

8. The method of claim 1, further comprising at least one of:
determining the projected route based on a current location of the mobile terminal and a current speed and direction of motion of the mobile terminal, and
determining the projected route based on route guidance being provided to the mobile terminal to guide a user of the mobile terminal to a selected destination.

9. The method of claim 1, wherein the geo-predictive next application data unit further comprises at least one of an expected time duration of the outage event and estimated capacity vector.

10. The method of claim 1, further comprising
causing provision of a location-specific update from the mobile terminal to the congestion map server, the location-specific update comprising information indicative of operator name, current position, radio signal strength, throughput, trajectory, direction, speed of the user or age of the information.

11. The method of claim 1, further comprising
causing provision of a look-ahead request to the congestion map server and receiving a look-ahead response from the congestion map server, the look-ahead request defining operator name, current position, trajectory, direction, speed of the user or look-ahead distance, the look-ahead response defining a future location and corresponding expected channel capacity.

12. An apparatus comprising at least one processor and at least one memory including computer program code, the at least one memory and the computer program code configured to, with the at least one processor, cause the apparatus to at least:
receive, at a mobile terminal, an indication of network performance parameters associated with a corresponding time and location of a projected route of the mobile terminal;
determine, at the mobile terminal, whether a portion of the projected route corresponds to an outage event with respect to data being streamed to the mobile terminal; and
in response to a determination that the outage event corresponds to the portion of the projected route, cause communication of at least one of a geo-predictive next application data unit and an estimated capacity vector to a streaming server providing the data being streamed to cause a modification to a data transmission rate at which data is to be streamed to the mobile terminal,
wherein the geo-predictive next application data unit comprises a total buffer space, an amount of data deficit associated with the outage event, and a buffering compensation time, and wherein the estimated capacity vector comprises at least one expected channel capacity and at least one time offset corresponding to said at least one expected channel capacity.

13. The apparatus of claim 12, wherein the at least one memory and computer program code are further configured to, with the at least one processor, cause the apparatus to perform
providing a report on local network performance parameters to a congestion map server that uses the report along with reports from a plurality of other mobile terminals to define a congestion map associating network performance parameters with corresponding geographic locations.

14. The apparatus of claim 12, wherein the at least one memory and computer program code are further configured to, with the at least one processor, cause the apparatus to transmit updated speed information of the mobile terminal to the streaming server, said updated speed information being used by the streaming server to adjust one or more of said buffering compensation time period and said at least one time offset corresponding to said at least one expected channel capacity.

15. The apparatus of claim 12, wherein the at least one memory and computer program code are further configured to, with the at least one processor, cause the apparatus to:
determine a start time of the outage event;
determine a duration of the outage event; and determine an amount of data deficit associated with the outage event.

16. The apparatus of claim 15, wherein the at least one memory and computer program code are further configured to, with the at least one processor, cause the apparatus to cause communication of the information by requesting an increase in the data transmission rate such that data at least equivalent to the amount of data deficit is to be received prior to the starting time of the outage event.

17. The apparatus of claim 16, wherein the at least one memory and computer program code are configured to, with the at least one processor, cause the apparatus to request the increase in the data transmission rate based on determining a time for initiation of the increase in the rate such that a period during which the increase in the rate is applicable occurs proximate to the start of the outage event.

18. The apparatus of claim 16, wherein the at least one memory and computer program code are configured to, with the at least one processor, cause the apparatus to request the increase in the data transmission rate based on defining the request based on expected channel capacity values corresponding to areas along the projected route that are encountered prior to a time of onset of the outage event.

19. The apparatus of claim 12, wherein the at least one memory and computer program code are further configured to, with the at least one processor, cause the apparatus to perform at least one of determining the projected route based on a current location of the mobile terminal and a current speed and direction of motion of the mobile terminal; and determining the projected route based on route guidance being provided to the mobile terminal to guide a user of the mobile terminal to a selected destination.

20. The apparatus of claim 12, wherein the apparatus is a mobile terminal and further comprises user interface circuitry configured to facilitate user control of at least some functions of the mobile terminal.

21. The apparatus of claim 12, wherein the geo-predictive next application data unit further comprises at least one of an expected time duration of the outage event and estimated capacity vector.

22. The apparatus of claim 12, wherein the at least one memory and computer program code are further configured to, with the at least one processor, cause the apparatus to perform
causing provision of a location-specific update from the mobile terminal to the congestion map server, the location-specific update comprising information indicative of operator name, current position, radio signal strength, throughput, trajectory, direction, speed of the user or age of the information.

23. The apparatus of claim 12, wherein the at least one memory and computer program code are further configured to, with the at least one processor, cause the apparatus to perform
causing provision of a look-ahead request to the congestion map server and receiving a look-ahead response from the congestion map server, the look-ahead request defining operator name, current position, trajectory, direction, speed of the user or look-ahead distance, the look-ahead response defining a future location and corresponding expected channel capacity.

24. A computer program product comprising at least one computer-readable storage medium having computer-executable program code instructions stored therein, the computer-executable program code instructions comprising program code instructions for:
receiving, at a mobile terminal, an indication of network performance parameters associated with a corresponding time and location of a projected route of the mobile terminal;
determining, at the mobile terminal, whether a portion of the projected route corresponds to an outage event with respect to data being streamed to the mobile terminal; and
in response to a determination that the outage event corresponds to the portion of the projected route, causing communication of at least one of a geo-predictive next application data unit and an estimated capacity vector to a streaming server, providing the data being streamed, to cause a modification to a data transmission rate at which data is to be streamed to the mobile terminal,
wherein the geo-predictive next application data unit comprises a total buffer space, an amount of data deficit associated with the outage event, and a buffering compensation time, and wherein the estimated capacity vector comprises at least one expected channel capacity and at least one time offset corresponding to said at least one expected channel capacity.

25. A system comprising:
a mobile terminal receiving streamed data;
a streaming server providing the streamed data to the mobile terminal; and
a congestion map server,
wherein the mobile terminal is configured to receive an indication of network performance parameters associated with a corresponding time and location of a projected route of the mobile terminal from the congestion map server, determine whether a portion of the projected route corresponds to an outage event with respect to data being streamed to the mobile terminal, and, in response to a determination that the outage event corresponds to the portion of the projected route, causing communication of at least one of a geo-predictive next application data unit and an estimated capacity vector to the streaming server to cause the streaming server to modify a data transmission rate of the data being streamed to the mobile terminal,
wherein the geo-predictive next application data unit comprises a total buffer space, an amount of data deficit associated with the outage event, and a buffering compensation time, and wherein the estimated capacity vector comprises at least one expected channel capacity and at least one time offset corresponding to said at least one expected channel capacity.

26. A method comprising:
providing streaming data to a mobile terminal;
receiving, in response to a determination by the mobile terminal that an outage event corresponds to a portion of a projected route of the mobile terminal, communication of at least one of a geo-predictive next application data unit and an estimated capacity vector; and
causing modification of a data transmission rate at which data is to be streamed to the mobile terminal based on the at least one of the geo-predictive next application data unit and the estimated capacity vector,
wherein the geo-predictive next application data unit comprises a total buffer space, an amount of data deficit associated with the outage event, and a buffering compensation time, and wherein the estimated capacity vector comprises at least one expected channel capacity and at least one time offset corresponding to said at least one expected channel capacity.

27. The method of claim 26, further comprising receiving updated speed information of the mobile terminal, said updated speed information being usable to adjust one or more of said buffering compensation time period and said at least one time offset corresponding to said at least one expected channel capacity.

28. An apparatus comprising at least one processor and at least one memory including computer program code, the at least one memory and the computer program code configured to, with the at least one processor, cause the apparatus to at least:

provide streaming data to a mobile terminal;

receive, in response to a determination by the mobile terminal that an outage event corresponds to a portion of a projected route of the mobile terminal, communication of at least one of a geo-predictive next application data unit and an estimated capacity vector; and causing modification of a data transmission rate at which data is to be streamed to the mobile terminal based on the at least one of the geo-predictive next application data unit and the estimated capacity vector, wherein the geo-predictive next application data unit comprises a total buffer space, an amount of data deficit associated with the outage event, and a buffering compensation time, and wherein the estimated capacity vector comprises at least one expected channel capacity and at least one time offset corresponding to said at least one expected channel capacity.

29. The apparatus of claim 28, wherein the at least one memory and computer program code are further configured to, with the at least one processor, cause the apparatus to receive updated speed information of the mobile terminal, said updated speed information being usable to adjust one or more of said buffering compensation time period and said at least one time offset corresponding to said at least one expected channel capacity.

* * * * *

UNITED STATES PATENT AND TRADEMARK OFFICE
CERTIFICATE OF CORRECTION

PATENT NO. : 8,391,896 B2
APPLICATION NO. : 12/833747
DATED : March 5, 2013
INVENTOR(S) : Curcio et al.

It is certified that error appears in the above-identified patent and that said Letters Patent is hereby corrected as shown below:

In the Specifications:

Column 23,
Line 20, "resealed" should read --rescaled--.

Signed and Sealed this
Third Day of September, 2013

Teresa Stanek Rea
*Acting Director of the United States Patent and Trademark Office*